(12) United States Patent
Shimokawa et al.

(10) Patent No.: US 8,587,834 B2
(45) Date of Patent: Nov. 19, 2013

(54) SHADING CORRECTION APPARATUS IN IMAGE SCANNING APPARATUS

(75) Inventors: Koji Shimokawa, Shizuoka (JP); Yusuke Hashizume, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 990 days.

(21) Appl. No.: 12/652,231

(22) Filed: Jan. 5, 2010

(65) Prior Publication Data

US 2010/0177360 A1  Jul. 15, 2010

Related U.S. Application Data

(60) Provisional application No. 61/145,064, filed on Jan. 15, 2009.

(51) Int. Cl.
 *H04N 1/40* (2006.01)
(52) U.S. Cl.
 USPC .......................................... 358/2.1; 368/461
(58) Field of Classification Search
 USPC ........... 358/1.9, 2.1, 400, 406, 500, 504, 461, 358/448, 516, 518–519
 See application file for complete search history.

(56) References Cited

U.S. PATENT DOCUMENTS

| 5,099,341 A | * | 3/1992 | Nosaki et al. ................ 358/461 |
| 5,982,948 A | * | 11/1999 | Shimada et al. .............. 382/274 |
| 2002/0003908 A1 | | 1/2002 | Kijima et al. |

FOREIGN PATENT DOCUMENTS

| JP | 3255574 B2 | 11/2001 |
| JP | 2002095004 A | * 3/2002 |

\* cited by examiner

*Primary Examiner* — Thomas D Lee
*Assistant Examiner* — Stephen M Brinich
(74) *Attorney, Agent, or Firm* — Patterson & Sheridan, LLP

(57) ABSTRACT

A shading correction apparatus includes: a light irradiating unit configured to scan an original document; a reference plate located in a scanning area of the light irradiating unit; a detecting unit configured to receive reflected light from the original document or the reference plate of light irradiated by the light irradiating unit; a first control unit configured to classify plural areas of the reference plate, which are divided in a direction perpendicular to a traveling direction of the light irradiating unit, as plural blocks, scan the reference plate for each of the blocks with the light irradiating unit, and detect valid areas of the plural blocks; and a second control unit configured to set the valid areas of the plural blocks as adopted areas used for shading correction.

14 Claims, 4 Drawing Sheets

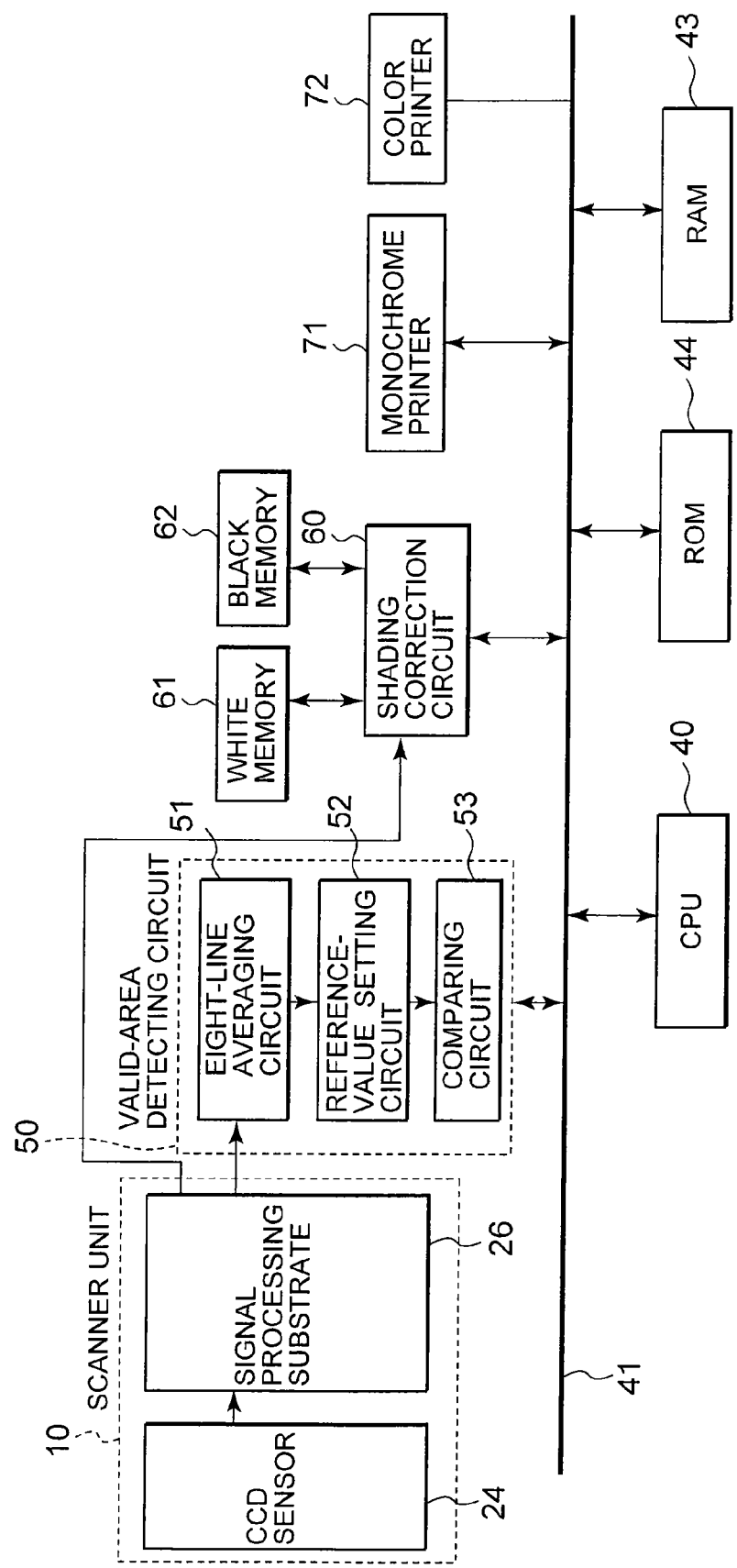

SHADING CORRECTION APPARATUS IN IMAGE SCANNING APPARATUS

CROSS-REFERENCE TO RELATED APPLICATION

This application is based upon and claims the benefit of priority from Provisional U.S. Application 61/145,064 filed on Jan. 15, 2009, the entire contents of which are incorporated herein by reference.

TECHNICAL FIELD

The present invention relates to a shading correction apparatus configured to correct fluctuation in a characteristic of an optical system of an image scanning apparatus, and, more particularly to a method of using valid areas avoiding invalid areas of a shading correction plate.

BACKGROUND

In an image scanning apparatus, an optical characteristic fluctuates because of aged deterioration of a light source, an environmental state of an optical system, and the like and an image scanning signal generated by a photoelectric conversion device (CCD) fluctuates. Therefore, in the past, the image scanning apparatus subjects the image scanning signal generated by the CCD to shading correction to always obtain the same image reproducibility even when the optical characteristic fluctuates.

For example, Japanese Patent No. 3255574 discloses an apparatus that changes the number of scanning lines of a shading correction plate according to copying magnification, averages scanned data into data for shading correction, and corrects fluctuation in an image scanning signal generated by a CCD using the data for shading correction.

However, when there is an area where dust adheres or air bubbles occur in the shading correction plate, if the area is scanned during shading correction, it is likely that correct data for shading correction cannot be obtained. If the data for shading correction is not correct, it is likely that correction unevenness occurs in a document scanning signal after correction and image reproducibility falls.

Therefore, there is a demand for development of a shading correction apparatus that can obtain, when there is an area where dust adheres or air bubbles occur in a shading correction plate, correct data for shading correction, prevent correction unevenness during shading correction, and improve image reproducibility even if replacement work or position adjustment work for the shading correction plate is not performed during manufacturing or during maintenance.

SUMMARY

According to an embodiment of the present invention, a shading correction apparatus includes: a light irradiating unit configured to scan an original document; a reference plate located in a scanning area of the light irradiating unit; a detecting unit configured to receive reflected light from the original document or the reference plate of light irradiated by the light irradiating unit; a first control unit configured to classify plural areas of the reference plate, which are divided in a direction perpendicular to a traveling direction of the light irradiating unit, as plural blocks, scan the reference plate for each of the blocks with the light irradiating unit, and detect valid areas of the plural blocks; and a second control unit configured to set the valid areas of the plural blocks as adopted areas used for shading correction.

DESCRIPTION OF THE DRAWINGS

FIG. 2 is a schematic block diagram of a control system according to the first embodiment;

DETAILED DESCRIPTION

Figure 1:
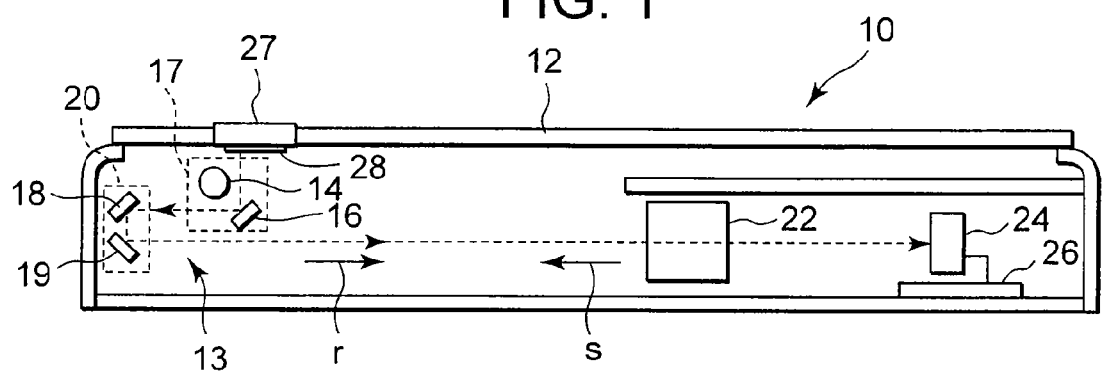
FIG. 1 is a schematic structural diagram of a main part of a scanner unit according to a first embodiment of the present invention.

A first embodiment of the present invention is explained below. FIG. 1 is a schematic structural diagram of a main part of a scanner unit 10 as an image scanning apparatus. The scanner unit 10 includes an exposing device 13 configured to scan an original document D on a document table 12 made of a colorless transparent glass plate. The exposing device 13 includes a first carriage 17 mounted with an exposure lamp 14 and a mirror 16 and a second carriage 20 mounted with mirrors 18 and 19. The second carriage 20 travels at half speed of the first carriage 17. The first carriage 17 and the second carriage 20 travel in an arrow r direction during forward movement and travel in an arrow s direction during backward movement.

The scanner unit 10 includes a condensing lens 22 configured to condense reflected light from the original document D led by the exposing device 13, a CCD sensor 24 as a detecting unit configured to receive the reflected light from the original document D condensed by the condensing lens 22 and convert the reflected light into an electric signal, and a signal processing substrate 26 configured to process the electric signal from the CCD sensor 24. The exposing device 13 and the condensing lens 22 configure a light irradiating unit.

The document table 12 includes, at an end on a document scanning start side, an indicator 27 configured to display various document sizes. The document table 12 includes, on the lower surface of the indicator 27, a white shading correction plate 28 serving as a reference plate. The shading correction plate 28 is provided in a scanning area of the exposing device 13.

During image scanning, to correct scanned data, the scanner unit 10 scans the shading correction plate 28 to obtain data for shading correction before scanning the original document D. The scanner unit 10 turns on the exposure lamp 14, scans the shading correction plate 28, and obtains a white reference value for shading correction from an output of the CCD sensor 24 at this time. Then, the scanner unit 10 turns off the exposure lamp 14, scans the shading correction plate 28, and obtains a black reference value for shading correction from an output of the CCD sensor 24 at this time. Thereafter, the scanner unit 10 scans the original document D, subjects an output of the CCD sensor 24 at this time to shading correction, and obtains print data for executing desired printing.

However, when dust adheres to the shading correction plate 28, correct data for shading correction cannot be obtained. Therefore, the scanner unit 10 does not scan areas where the dust adheres in the shading correction plate 28, scans areas where dust does not adhere, and obtains highly accurate data for shading correction.

The shading correction plate 28 is manufactured with predetermined width and arranged under the indicator 27. However, depending on a difference in brightness between the shading correction plate 28 and a supporting member therefor, in some case, stray light occurs in a boundary section between the shading correction plate 28 and the supporting member. It is likely that the shading correction plate 28 is darkened by the stray light, which occurs in the boundary section between the shading correction plate 28 and the supporting member, and correct data for shading correction cannot be obtained.

When the shading correction plate 28 is attached under the indicator 27, in some case, an attaching position of the shading correction plate 28 slightly fluctuates. In particular, it is difficult to highly accurately adjust the attaching position of the shading correction plate 28. Therefore, a manufacturing process for the shading correction plate 28 takes time. When the attaching position deviates and an end of the shading correction plate 28 is slanted, it is likely that correct data for shading correction cannot be obtained over the entire length in a main scanning direction at the end.

The scanner unit 10 does not scan areas where the stray light occurs, scans areas without the influence of the stray light, and obtains highly accurate data for shading correction. Further, the scanner unit 10 does not scan areas where the influence of the positional deviation of the shading correction plate 28 occurs, scans areas where the shading correction plate 28 is present over the entire length of the main scanning direction, and obtains highly accurate data for shading correction.

Control for scanning, avoiding the areas where dust adheres, the areas where the stray light occurs, and the areas where the influence of the positional deviation occurs of the shading correction plate 28, areas without the influence of the dust, the stray light, and the positional deviation (valid areas) and obtaining highly accurate data for shading correction is explained below. A block diagram of a control system for mainly detecting the valid areas of the shading correction plate 28 is shown in FIG. 2.

A CPU 40 is connected to the scanner unit 10 via an I/O interface 41 and controls the entire scanner unit 10. The CPU 40 connected to a random access memory (RAM) 43 and a read only memory (ROM) 44 is connected to a valid-area detecting circuit 50, which is a first control unit, via the I/O interface 41. The CPU 40 is connected to a shading correction circuit 60, which is a correction control unit, a monochrome printer 71, and a color printer 72 via the I/O interface 41. The monochrome printer 71 and the color printer 72 print desired images on the basis of image scanning data subjected to shading correction. The CPU 40 can be connected not only to the monochrome printer 71 and the color printer 72 but also to other external apparatuses.

The shading correction circuit 60 includes a white memory 61 configured to store a white reference value and a black memory 62 configured to a black reference value obtained by scanning the shading correction plate 28.

Figure 3:
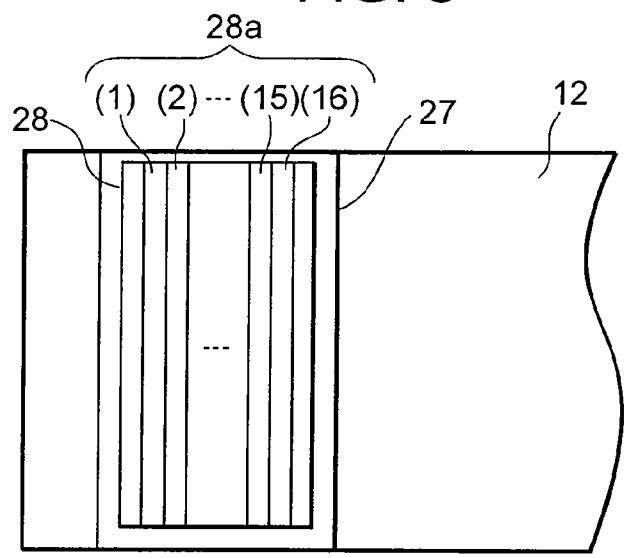
FIG. 3 is a schematic explanatory diagram of divided areas of a shading correction plate according to the first embodiment viewed from above.
Figure 4:
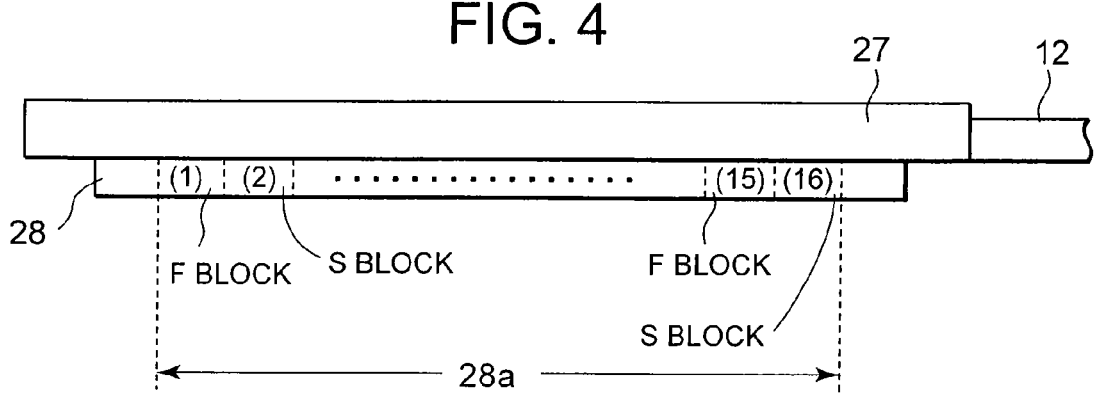
FIG. 4 is a schematic explanatory diagram of the divided areas of the shading correction plate according to the first embodiment viewed from a side.

The valid-area detecting circuit 50 includes an eight-line averaging circuit 51, a reference-value setting circuit 52, and a comparing circuit 53. The valid-area detecting circuit 50 divides the shading correction plate 28 into plural blocks in a direction perpendicular to a traveling direction of the exposing device 13 and detects valid areas. For example, as shown in FIGS. 3 and 4, the valid-area detecting circuit 50 divides an implementation area 28a of the shading correction plate 28 as sixteen small areas and detects valid areas. While scanning one small area of the implementation area 28a, the CCD sensor 24 scans eight lines of luminance data obtained by exposure.

The divided small areas of the implementation area 28a are sequentially given numbers (1) to (16) along an arrow r direction, which is a traveling direction during forward movement of the exposing device 13. For example, all the small areas having odd numbers of the implementation area 28a are classified as F blocks, which are first blocks. All the small areas having even numbers of the implementation area 28a are classified as S blocks, which are second blocks. The valid-area detecting circuit 50 detects, for each of the blocks, valid areas of the F blocks and valid areas of the S blocks in the implementation area 28a.

The eight-line averaging circuit 51 of the valid-area detecting circuit 50 calculates an average luminance value of luminance data of eight lines of each of the small areas input from the signal processing substrate 26 according to first scanning of the small areas. The reference-value setting circuit 52 replaces, while sequentially scanning the small areas, average luminance values of the small areas obtained by the eight-line averaging circuit 51 with larger average luminance values and sets a maximum average luminance value. The comparing circuit 53 compares an average luminance value of eight lines of each of the small areas input from the signal processing substrate 26 according to second scanning with the maximum average luminance value set by the reference-value setting circuit 52. When a difference between the average luminance value and the maximum average luminance value is smaller than a predetermined threshold, the comparing circuit 53 detects the small area as a valid area.

For example, when the difference between the average luminance value and the maximum average luminance value is smaller than 10% of the maximum average luminance value, the comparing circuit 53 detects the small area as a valid area. However, the predetermined threshold is not limited to this. In a small area where dust is present, a small area affected by stray light, and a small area having a slanted end of the shading correction plate 28, in general, an average luminance value is low. Therefore, these small areas are not valid areas.

Figure 5:
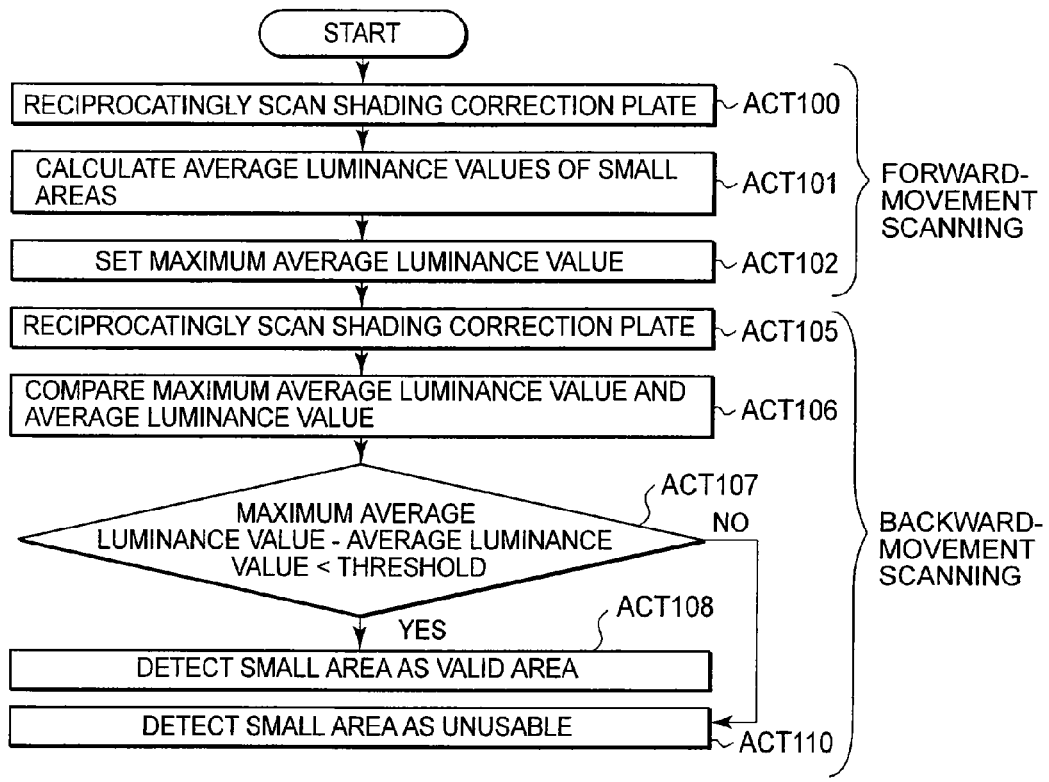
FIG. 5 is a flowchart for explaining operation for detecting valid areas of the shading correction plate according to the first embodiment.

A flowchart for explaining operation for detecting valid areas of the shading correction plate 28 with the valid-area detecting circuit 50 is shown in FIG. 5. When detection of valid areas is started, the exposing device 13 moves forward in the arrow r direction and scans the small areas for the blocks of the shading correction plate 28 in order from the small area having a smallest number (ACT 100). The eight-line averaging circuit 51 calculates average luminance values of the small areas of arbitrary blocks (ACT 101). The reference-value setting circuit 52 sets a maximum average luminance value among the average luminance values of the small areas (ACT 102) and finishes the forward-movement scanning of the arbitrary blocks.

Subsequently, the exposing device 13 moves backward in the arrow s direction and scans the small areas of an arbitrary block of the shading correction plate 28 in order from the small area having a largest number. The eight-line averaging circuit 51 calculates an average luminance value of each of the small areas during the backward movement (ACT 105). The comparing circuit 53 compares the average luminance value during the backward movement of the small area with the maximum luminance value (ACT 106). When a difference between the maximum average luminance value and the average luminance value is smaller than the predetermined threshold (Yes in ACT 107), the valid-area detecting circuit 50 detects that the small area is a valid area (ACT 108).

When the difference between the maximum average luminance value and the average luminance value is equal to or larger than the predetermined threshold (No in ACT 107), the valid-area detecting circuit 50 determines dust or the like is present in the small area, the small area is affected by stray light, or the small area is slanted and detects that the small area is an area where correct data for shading correction cannot be obtained. The valid-area detecting circuit 50 detects the small area where the difference between the maximum average luminance value and the average luminance value is equal to or larger than the predetermined threshold is unusable and is not a valid area (ACT 110).

Figure 6:
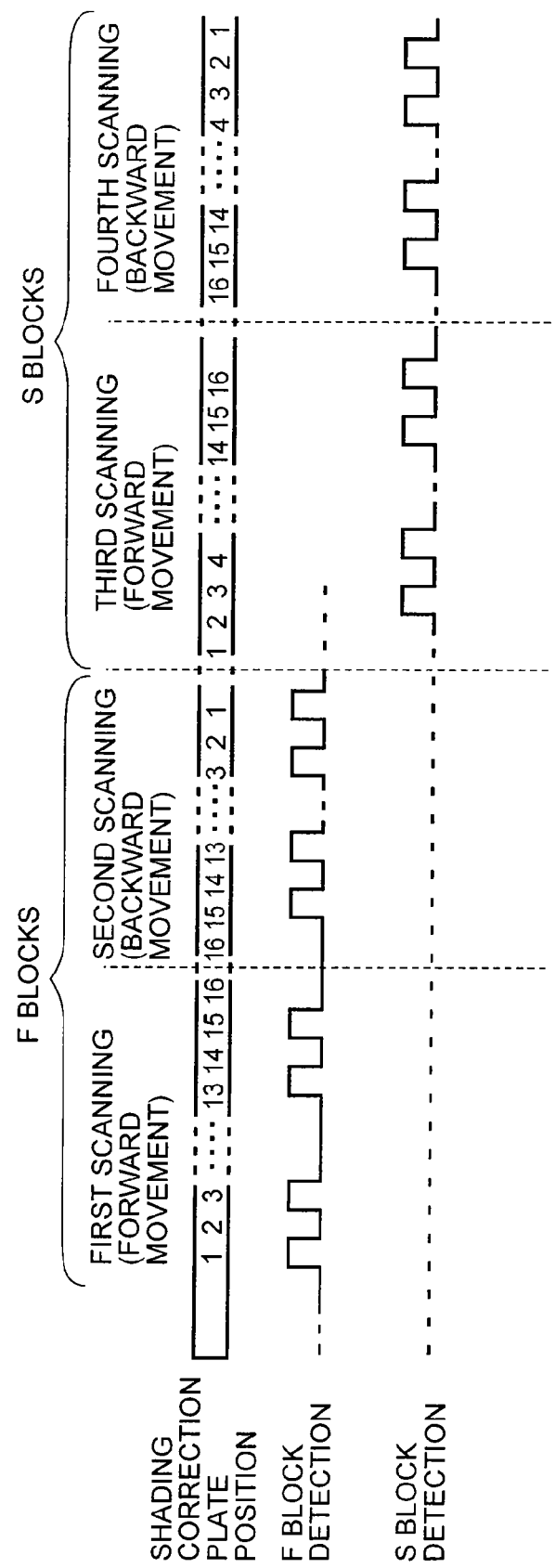
FIG. 6 is a timing chart of detection of valid areas for each of blocks according to the first embodiment.

A timing chart of processing for detecting valid areas of the shading correction plate 28 is shown in FIG. 6. In the detection of valid areas of the shading correction plate 28, first, valid areas of the F blocks are detected and, then, valid areas of the S blocks are detected. To detect valid areas of the shading correction plate 28, the valid-area detecting circuit 50 scans the implementation area 28*a* for the first time while the exposing device 13 moves forward. In the first scanning, the valid-area detecting circuit 50 scans all the small areas (1), (3), . . . , (13), and (15) of the F blocks in order from the small area having the smallest number. The valid-area detecting circuit 50 executes, according to the first scanning, ACT 100 to ACT 102 of the flowchart shown in FIG. 5 and sets a maximum average luminance value of the F blocks, which is a first maximum average luminance value.

After scanning eight lines of arbitrary small areas of the F blocks, the valid-area detecting circuit 50 executes ACT 100 to ACT 102 of the flowchart at timing when the exposing device 13 moves a distance equivalent to the small areas of the S blocks adjacent to the arbitrary small areas.

If the shading correction plate 28 is divided into plural small areas and it is attempted to continuously scan small areas adjacent to one another, the valid-area detecting circuit 50 needs to secure timing for processing scanned data. As a method of securing timing for processing scanned data, there is a method of arranging an interval area between small areas adjacent to each other of the shading correction plate 28. In this method, while the exposing device 13 scans the interval area, the valid-area detecting circuit 50 processes data of the small area scanned earlier.

However, when interval areas are arranged in the shading correction plate 28, it is likely that the width of shading correction plate 28 is increased to prevent a reduction in size of a scanner unit. On the other hand, in this embodiment, since the small areas adjacent to one another are scanned at an interval of one small area, interval areas are unnecessary. Therefore, the width of the shading correction plate 28 can be reduced.

After finishing the first scanning, the valid-area detecting circuit 50 scans the implementation area 28*a* for the second time while the exposing device 13 moves backward. In the second scanning, the valid-area detecting circuit 50 scans the small areas of the F blocks in order from the small area having the largest number. The valid-area detecting circuit 50 executes ACT 105 to ACT 110 of the flowchart according to the second scanning and detects valid areas of the F blocks, which are valid areas of the first blocks. The CPU 40 stores the valid areas of the F blocks detected by the valid-area detecting circuit 50 in the ROM 44. The CPU 40 functioning as a second control unit sets the valid areas of the F blocks, which are stored in the ROM 44, as adopted areas for obtaining data for shading correction.

Subsequently, the valid-area detecting circuit 50 scans the implementation area 28*a* for the third time while the exposing device 13 moves forward for the second time. In the third scanning, the valid-area detecting circuit 50 scans all the small areas (2), (4), . . . , (14), and (16) of the S blocks in order from the small area having the smallest number. The valid-area detecting circuit 50 executes ACT 100 to ACT 102 of the flowchart shown in FIG. 5 according to the third scanning and sets a maximum average luminance value of the S blocks, which is a second maximum average luminance value. After scanning eight lines of arbitrary small areas of the S blocks, the valid-area detecting circuit 50 executes ACT 100 to ACT 102 of the flowchart at timing when the exposing device 13 moves a distance equivalent to the small areas of the F blocks adjacent to the arbitrary small areas.

After finishing the third scanning, the valid-area detecting circuit 50 scans the implementation area 28*a* for the fourth time while the exposing device 13 moves backward for the second time. In the fourth scanning, the valid-area detecting circuit 50 scans the small areas of the S blocks in order from the small area having the largest number. The valid-area detecting circuit 50 executes ACT 105 to ACT 110 of the flowchart according to the fourth scanning and detects valid areas of the S blocks, which are valid areas of the second blocks. The CPU 40 stores the valid areas of the S blocks detected by the valid-area detecting circuit 50 in the ROM 44 and sets the valid areas of the S blocks, which are stored in the ROM 44, as adopted areas for obtaining data for shading correction.

During image scanning, before scanning the original document D, the scanner unit 10 scans areas in the implementation area 28*a* equivalent to the adopted areas of the F blocks and the adopted areas of the S blocks, which are stored in the ROM 44, to obtain data for shading correction. The shading correction circuit 60 stores a white reference value and a black reference value obtained by scanning the adopted areas of the F blocks and the adopted areas of the S blocks of the shading correction plate 28 in the white memory 61 and the black memory 62, respectively. Both the white reference value and the black reference value are highly accurate data for shading correction obtained by scanning the adopted areas avoiding areas where dust adheres, areas where stray light occurs, and areas where the influence of positional deviation occurs of the shading correction plate 28.

Subsequently, the scanner unit 10 scans the original document D and inputs scanned data of the CCD sensor 24 to the shading correction circuit 60 from the signal processing substrate 26. The shading correction circuit 60 corrects, on the basis of the white reference value in the white memory 61 and the black reference value in the black memory 62 as highly accurate data for shading correction, the scanned data of the original document D to print data for executing desired printing. The CPU 40 transmits the print data subjected to shading correction to the monochrome printer 71 or the color printer 72.

In the first embodiment, the valid-area detecting circuit 50 detects valid areas for each of the blocks from the plural small areas classified as the F blocks and the S blocks of the shading correction plate 28 and sets the valid areas as adopted areas. The shading correction circuit 60 scans, before scanning the original document D, the adopted areas of the shading correction plate 28 to obtain highly accurate data for shading correction. In this way, the shading correction circuit 60 can satisfactorily subject scanned data of the original document D to shading correction. Since interval areas do not have to be provided in the shading correction plate 28, the shading correction plate 28 can be reduced in size. Further, it is possible to detect valid areas avoiding deviation of the end of the shading correction plate 28 and reduce time for a process for attaching the shading correction plate 28.

A second embodiment of the present invention is explained below. In the second embodiment, the accuracy of data for shading correction in the first embodiment is improved by further detecting dust present in boundaries between the F blocks and the S blocks and removing small areas (invalid areas) extending over the boundary areas where the dust is present from valid areas. In the second embodiment, components same as those explained in the first embodiment are denoted by the same reference numerals and signs and detailed explanation of the components is omitted.

Figure 7:
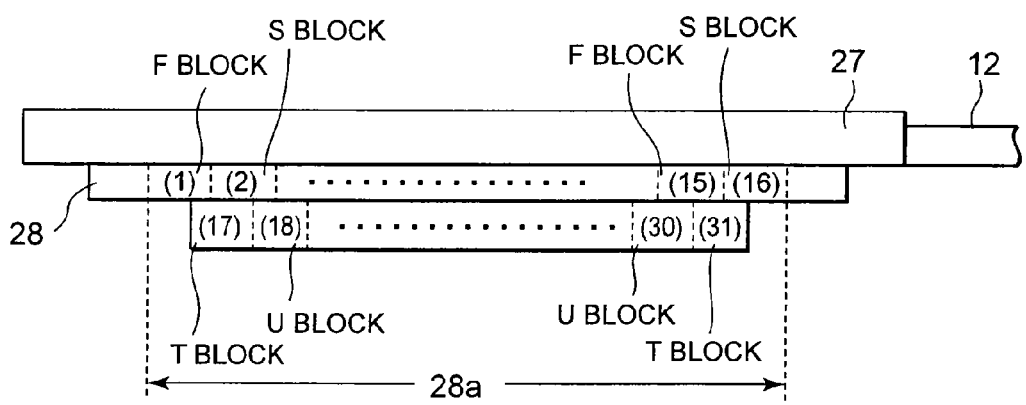
FIG. 7 is a schematic explanatory diagram of divided areas of a shading correction plate according to a second embodiment of the present invention viewed from a side.

The shading correction plate 28 divided into plural boundary areas is shown in FIG. 7. The implementation area 28a of the shading correction plate 28 divided into the small areas (1) to (16) is further divided into boundary areas extending across boundaries of the F blocks and the S blocks. The divided boundary areas are sequentially given numbers (17) to (31) along the arrow r direction. The boundary areas having odd numbers (17) to (31) are classified as T blocks, which are third blocks. The boundary areas having even numbers (18) to (30) are classified as U blocks, which are four blocks.

In this embodiment, as in the first embodiment, after detecting valid areas of the F blocks and the S blocks, the valid-area detecting circuit 50 detects valid areas of the T blocks and then detects valid areas of the U blocks. To detect valid areas of the T blocks and the U blocks of the shading correction plate 28, the valid-area detecting circuit 50 scans the implementation area 28a for the fifth time while the exposing device 13 moves forward. In the fifth scanning, the valid-area detecting circuit 50 scans the boundary areas (17) to (31) of the T blocks in order from the boundary area having the smallest number. The valid-area detecting circuit 50 executes, according to the fifth scanning, ACT 100 to ACT 102 of the flowchart shown in FIG. 5 and sets a maximum average luminance value of the T blocks, which is a third maximum average luminance value. After scanning eight lines of arbitrary boundary areas of the T blocks, the valid-area detecting circuit 50 executes ACT 100 to ACT 102 of the flowchart while the exposing device 13 moves a distance equivalent to boundary areas of the U blocks adjacent to the boundary areas.

After finishing the fifth scanning, the valid-area detecting circuit 50 scans the implementation area 28a for the sixth time while the exposing device 13 moves backward. In the sixth scanning, the valid-area detecting circuit 50 scans the boundary areas of the T blocks in order from the boundary area having the largest number. The valid-area detecting circuit 50 executes, according to the sixth scanning, ACT 105 to ACT 110 of the flowchart and detects valid areas of the T blocks. The CPU 40 stores the valid areas of the T blocks detected by the valid-area detecting circuit 50 in the ROM 44.

Subsequently, the valid-area detecting circuit 50 scans the implementation area 28a for the seventh time while the exposing device 13 moves forward. In the seventh scanning, the valid-area detecting circuit 50 scans all the boundary areas (18) to (30) of the U blocks in order from the boundary area having the smallest number. The valid-area detecting circuit 50 executes, according to the seventh scanning, ACT 100 to ACT 102 of the flowchart shown in FIG. 5 and sets a maximum average luminance value of the U blocks, which is a fourth maximum average luminance value. After scanning eight lines of arbitrary boundary areas of the U blocks, the valid-area detecting circuit 50 executes ACT 100 to ACT 102 of the flowchart at timing when the exposing device 13 moves a distance equivalent to boundary areas of the T blocks adjacent to the arbitrary boundary areas.

After finishing the seventh scanning, the valid-area detecting circuit 50 scans the implementation area 28a for the eighth time while the exposing device 13 moves backward. In the eighth scanning, the valid-area detecting circuit 50 scans the boundary areas of the U blocks in order from the boundary area having the largest number. The valid-area detecting circuit 50 executes, according to the eight scanning, ACT 105 to ACT 110 of the flowchart and detects valid areas of the U blocks. The CPU 40 stores the valid areas of the U blocks detected by the valid-area detecting circuit 50 in the ROM 44.

Thereafter, the CPU 40 stores the valid areas of the F blocks and the S blocks stored in the ROM 44, which are the small areas extending over the valid areas of the T blocks and the U blocks, in the ROM 44 as new valid areas. The CPU 40 sets the new valid areas, which are stored in the ROM 44, as new adopted areas for obtaining data for shading correction.

To more accurately perform shading correction, only when the F blocks and the S blocks are valid and the T blocks and the U blocks extending over the areas of the F blocks or the S blocks are valid, the F blocks and the S blocks may be adopted.

During image scanning, before scanning the original document D, the scanner unit 10 scans the new adopted areas stored in the ROM 44 in the implementation area 28a to obtain data for shading correction. The shading correction circuit 60 stores a white reference value and a black reference value obtained by scanning the new adopted areas of the shading correction plate 28 in the white memory 61 and the black memory 62, respectively. Both the white reference value and the black reference value are more highly accurate data for shading correction obtained by further scanning the new adopted area excluding small areas extending over the boundary areas where dust is present from the valid areas of the F blocks and the S blocks of the shading correction plate 28.

Thereafter, the shading correction circuit 60 subjects document scanning data from the CCD sensor 24 of the scanner unit 10 to shading correction on the basis of the more highly accurate data for shading correction. The CPU 40 transmits print data subjected to shading correction to the monochrome printer 71 or the color printer 72.

In the second embodiment, the valid-area detecting circuit 50 detects the valid areas detected for each of the blocks in the F blocks and the S blocks of the shading correction plate 28, which are the small areas extending over the valid areas of the T blocks and the U blocks, as the new valid areas and sets the valid areas as the new adopted areas for obtaining data for shading correction. The shading correction circuit 60 can more satisfactorily subject scanned data of the original document D to shading correction by scanning the new adopted areas of the shading correction plate 28 and obtaining more highly accurate data for shading correction.

The present invention is not limited to the embodiment and can be variously changed in the scope of the present invention. For example, when the small areas of the shading correction plate are classified as the F blocks and the S blocks, it is also possible to calculate a maximum average luminance value of the F blocks during first forward-movement scanning of the shading correction plate, calculate a maximum average luminance value of the S blocks during first backward-movement scanning, detect valid areas of the F blocks during second forward-movement scanning, and detect valid areas of the S blocks during second backward movement scanning.

The detecting unit may be a color CCD sensor or a single-color CCD sensor. The circuit configuration of the first control unit is not limited. Timing for detecting valid areas of the shading correction plate is arbitrary timing such as the time of manufacturing of the image scanning apparatus or the time of maintenance of the image scanning apparatus.

What is claimed is:

1. A shading correction apparatus comprising:
   a light irradiating unit configured to scan a document area;
   a reference plate located in a scanning area of the light irradiating unit;
   a detecting unit configured to detect light reflected from the document area or the reference plate;
   a first control unit configured to control the light irradiating unit to scan plural areas of the reference plate, and determine for each of the plural areas whether or not the area is a valid area based on the light reflected from the area and multiple lines of the light detected by the detecting unit; and
   a second control unit configured to set the areas determined to be valid as areas of the reference plate usable for shading correction.

2. The apparatus according to claim 1, wherein the first control unit is configured to classify the areas as a first area or a second area, and control the light irradiating unit to perform first, second, third, and fourth scanning, and wherein
   during the first scanning, the light irradiating unit scans the first areas, and the first control unit determines a first reference value based on the light reflected from the first areas and detected by the detecting unit,
   during the second scanning, the light irradiating unit scans the first areas, and the first control unit compares the first reference value with a value based on the light reflected from the first areas and detected by the detecting unit to determine for each of the first areas whether or not the first area is a valid area,
   during the third scanning, the light irradiating unit scans the second areas, and the first control unit determines a second reference value based on the light reflected from the second areas and detected by the detecting unit, and
   during the fourth scanning, the light irradiating unit scans the first areas, and the first control unit compares the second reference value with a value based on the light reflected from the second areas and detected by the detecting unit to determine for each of the second areas whether or not the second area is a valid area.

3. The apparatus according to claim 1, wherein the first control unit recognizes each of the areas of the reference plate by a unique reference number, each of the areas classified as one of the first areas being recognized by an odd number, and each of the areas classified as one of the second areas being recognized by an even number.

4. The apparatus according to claim 3, wherein
   the first areas and the second areas are alternately arranged along the scanning direction of the light irradiating unit, and the first control unit is configured to classify areas between the first areas and the second areas as boundary areas that include third and fourth areas, control the light irradiating unit to perform fifth, sixth, seventh, and eighth scanning, and recognize each of the boundary areas by a unique reference number, each of the third areas being recognized by an odd number and each of the fourth areas being recognized by an even number, wherein
   during the fifth scanning, the light irradiating unit scans the third areas, and the first control unit determines a third reference value based on the light reflected from the third areas and detected by the detecting unit,
   during the sixth scanning, the light irradiating unit scans the third areas, and the first control unit compares the third reference value with a value based on the light reflected from the third areas and detected by the detecting unit to determine for each of the third areas whether or not the third area is a valid area,
   during the seventh scanning, the light irradiating unit scans the fourth areas, and the first control unit determines a fourth reference value based on the light reflected from the fourth areas and detected by the detecting unit, and
   during the eighth scanning, the irradiating unit scans the fourth areas, and the first control unit compares the fourth reference value with a value based on the light reflected from the fourth areas and detected by the detecting unit to determine for each of the fourth areas whether or not the fourth area is a valid area, and wherein
   the second control unit is configured to set the first and second areas that are determined to be valid areas as the areas of the reference plate usable for shading correction if the corresponding adjacent third and fourth areas are also determined to be valid areas.

5. The apparatus according to claim 2, wherein the first control determines an average luminance value for each of the first and second areas, and the first reference value is a maximum of the average luminance value of the first areas, and the first control unit determines a first area to be a valid area if the difference between the average luminance value thereof and the first reference value is less than a predetermined value, and determines a second area to be a valid area if the difference between the average luminance value thereof and the second reference value is less than the predetermined value.

6. The apparatus according to claim 1, wherein the first control unit includes an averaging circuit configured to obtain the average luminance value for each of the areas and a reference-value setting circuit configured to determine a maximum of the average luminance valued as reference value of the areas.

7. The apparatus according to claim 1, wherein the first control unit controls the light irradiating unit to reciprocatingly scan the reference plate while determining the valid areas of the reference plate.

8. An image scanning apparatus comprising:
   a document table configured to support a document;
   a light irradiating unit configured to scan a document area of the document table;
   a reference plate located in a scanning area of the light irradiating unit;
   a detecting unit configured to detect light reflected from the document are or the reference plate;
   a first control unit configured to control the light irradiating unit to scan plural areas of the reference plate, and determine for each of the plural areas whether or not the area is a valid area based on the light reflected from the area and multiple lines of the light detected by the detecting unit;
   a second control unit configured to set the areas determined to be valid as areas of the reference plate usable for shading correction; and
   a correction control unit configured to control the light irradiating unit to scan the areas usable for the shading correction and perform the shading correction of scanned data of the document based on the scanned data of the areas usable for the shading correction.

9. The apparatus according to claim 8, wherein the first control unit is configured to classify the areas as a first area or a second area, and control the light irradiating unit to perform first, second, third, and fourth scanning, and wherein during the first scanning, the light irradiating unit scans the first areas, and the first control unit determines a first reference value based on the light reflected from the first areas and detected by the detecting unit, during the second scanning, the light irradiating unit scans the first areas, and the first control unit compares the first reference value with a value based on the light reflected from the first areas and detected by the detecting unit to determine for each of the first areas whether or not the first area is a valid area, during the third scanning, the light irradiating unit scans the second areas, and the first control unit determines a second reference value based on the light reflected from the second areas and detected by the detecting unit, and, during the fourth scanning, the light irradiating unit scans the second areas, and the first control unit compares the second reference value with a value based on the light reflected from the second areas and detected by the detecting unit to determine for each of the second areas whether or not the second area is a valid area.

10. The apparatus according to claim 9, wherein the first control unit recognizes each of the areas of the reference plate by a unique reference number, each of the areas classified as one of the first areas being recognized by an odd number, and each of the areas classified as one of the second areas being recognized by an even number.

11. The apparatus according to claim 10, wherein the first areas and the second areas are alternately arranged along the scanning direction of the light irradiating unit, and the first control unit is configured to classify areas between the first areas and the second areas as boundary areas that include third and fourth areas, control the light irradiating unit to perform fifth, sixth, seventh, and eighth scanning, and recognize each of the boundary areas by a unique reference number, each of the third areas being recognized by an odd number and each of the fourth areas being recognized by an even number, wherein during the fifth scanning, the light irradiating unit scans the third areas, and the first control unit determines a third reference value based on the light reflected from the third areas and detected by the detecting unit, during the sixth scanning, the light irradiating unit scans the third areas, and the first control unit compares the third reference value with a value based on the light reflected from the third areas and detected by the detecting unit to determine for each of the third areas whether or not the third area is a valid area, during the seventh scanning, the light irradiating unit scans the fourth areas, and the first control unit determines a fourth reference value based on the light reflected from the fourth areas and detected by the detecting unit, and during the eighth scanning, the irradiating unit scans the fourth areas, and the first control unit compares the fourth reference value with a value based on the light reflected from the fourth areas and detected by the detecting unit to determine for each of the fourth areas whether or not the fourth area is a valid area, and wherein the second control unit is configured to set the first and second areas that are determined to be valid areas as the areas of the reference plate usable for shading correction if the corresponding adjacent third and fourth areas are also determined to be valid areas.

12. The apparatus according to claim 9, wherein the first control determines an average luminance value for each of the first and second areas, and the first reference value is a maximum of the average luminance value of the first areas, and the first control unit determines a first area to be a valid area if the difference between the average luminance value and the first reference value is less than a predetermined value, and determines a second area to be a valid area if the difference between the average luminance value thereof and the second reference value is less than the predetermined value.

13. The apparatus according to claim 8, wherein the first control unit includes an averaging circuit configured to obtain average luminance value for each of the areas and a reference-value setting circuit configured to determine a maximum of the average luminance valued as reference value of the areas.

14. The apparatus according to claim 8, wherein the first control unit controls the light irradiating unit to reciprocatingly scan the reference plate while determining the valid areas of the reference plate.

* * * * *